(12) United States Patent
Maus

(10) Patent No.: US 6,576,032 B2
(45) Date of Patent: Jun. 10, 2003

(54) PARTICLE FILTER OF METAL FOIL AND PROCESS FOR PRODUCING A PARTICLE FILTER

(75) Inventor: Wolfgang Maus, Bergisch Gladbach (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/992,286

(22) Filed: Nov. 19, 2001

(65) Prior Publication Data

US 2002/0050475 A1 May 2, 2002

Related U.S. Application Data

(63) Continuation of application No. PCT/EP00/04640, filed on May 22, 2000.

(30) Foreign Application Priority Data

May 28, 1999 (DE) .......................................... 199 24 584

(51) Int. Cl.[7] .............................................. B01D 39/10
(52) U.S. Cl. .............................. 55/446; 55/521; 55/525; 29/896.62
(58) Field of Search ........................ 55/434, 446, 521, 55/525, 526; 29/896.62; 210/498

(56) References Cited

U.S. PATENT DOCUMENTS 4,363,753 A  12/1982  Bozon et al.
4,799,944 A  * 1/1989  Dixon et al. ................... 55/446
5,512,075 A   4/1996  Ninomiya et al.

FOREIGN PATENT DOCUMENTS

| DE | 4106742 A1  | 9/1991 |
| DE | 4345122 A1  | 7/1995 |
| DE | 19704147 A1 | 8/1998 |
| DE | 29821009 U1 | 3/1999 |
| EP | 0134002 B1  | 3/1985 |
| EP | 0342415 A2  | 11/1989 |

* cited by examiner

Primary Examiner—Robert A. Hopkins
(74) Attorney, Agent, or Firm—Laurence A. Greenberg; Werner H. Stemer; Ralph E. Locher

(57) ABSTRACT

A particle filter of metal foil has walls defining fluid flow channels with inlets and outlets. A first channel has an open entry cross section at a first end side extended partway into the first channel. A second channel has an open exit cross section substantially corresponding to the entry cross section. One of the walls of the first channel has filter passage perforations leading to the second channel. A closure in the first channel, opposite the entry cross section, toward a second end side, closes off the first channel to the fluid. A process for producing a particle filter from metal foil includes pulling the metal foil from an endless storage device. A joining element or strip is applied to the metal foil. The metal foil is shaped into subsequent channels. The metal foil is wound or stacked to form first and second channels in opposite directions. The first channel has an open entry cross section at the first end side extending partway into the first channel. The first channel has a closure opposite the entry cross section toward the second end side. Mutually bearing contact surfaces of the channels are joined, creating a wholly metal foil particle filter.

15 Claims, 2 Drawing Sheets

PARTICLE FILTER OF METAL FOIL AND PROCESS FOR PRODUCING A PARTICLE FILTER

CROSS-REFERENCE TO RELATED APPLICATION

This application is a continuation of copending International Application No. PCT/EP00/04640, filed May 22, 2000, which designated the United States.

BACKGROUND OF THE INVENTION

Field of the Invention

The present invention relates to a particle filter of metal foil having mutually adjacent channels through which a fluid can flow. Each channel has at least one inlet and an outlet. The particle filter also has adjacent first and second channels. The first channel has an open entry cross section at a first end side of the particle filter. The invention also relates to a process for producing a particle filter.

European Patent 0 134 002 B1 has disclosed a diesel exhaust filter made from woven wire cloth and a process for its production. The diesel exhaust filter is constructed from layers which can be placed on top of one another or shaped helically to form an assembly. A layer includes a corrugated or folded screening cloth and a planar, continuous or perforated covering layer. Two end surfaces of the diesel exhaust filter are constructed in such a way that a closed end-face section lies opposite an open end-face section and an end-face section is closed by pinching. The corrugated or folded layer is pressed onto the planar layer in folds for that purpose.

SUMMARY OF THE INVENTION

It is accordingly an object of the invention to provide a particle filter of metal foil and a process for producing a particle filter, which overcome the hereinafore-mentioned disadvantages of the heretofore-known products and processes of this general type and which allow simplified production of the particle filter while at the same time producing a large surface area in the particle filter.

With the foregoing and other objects in view there is provided, in accordance with the invention, a particle filter, comprising first and second end sides. A metal foil forms walls defining mutually adjacent channels through which a fluid can flow. Each of the channels has at least one inlet and at least one outlet. The channels include first and second adjacent channels defined by the walls formed of the metal foil. The first channel has an open entry cross section at the first end side extended at least partway into the first channel. The second channel has an open exit cross section at least substantially corresponding to the entry cross section. At least one of the walls defining the first channel has perforations formed therein as filter passages leading to the second channel. A closure is disposed at the first channel, opposite the entry cross section and toward the second end side, for closing off the first channel to the fluid, at least as far as possible.

The fact that the walls of the first and second channels are made from metal foil means that they each have a large surface area which comes into contact with the fluid. While only the individual filaments of the cloth are available as surface area when using a woven wire cloth, a wall which helps to form the first channel has a surface that is continuous apart from the perforations. The perforations, acting as filter passages leading to the adjacent second channel, also have a surface with which the fluid can come into contact. Therefore, compared to a woven wire cloth, a perforated wall of that type has a larger surface area which also has a larger active surface area, for example, either when provided with a suitable coating or when the material of the metal foil is selected appropriately. It can be utilized for catalytic or other reactions or possible applications of a particle filter of that type.

The advantage of a large surface area is combined with the advantage that such a particle filter can be produced in a small number of working steps. The perforations which are required are, for example, prefabricated in the metal foil. The corresponding shaping to form the individual channels is advantageously completed in a single working step, irrespective of whether or not the metal foil has perforations. By way of example, it is advantageous if all of the walls which form the channels have perforations, so that during production the metal foil or foils can be processed independently of position and orientation.

Furthermore, perforating metal foil enables an accurate position of the filter passages to be achieved in the subsequent particle filter. While woven wire cloth is at risk of filaments shifting during processing, that is impossible in the case of perforations in the metal foil. That type of filter passages also enables the density of perforations to be varied over the metal foil and therefore the channel wall which is to be formed. It also enables a diameter of such a perforation to be varied. That option can be employed in particular if different filter stages are to be formed in the particle filter.

In order to avoid a high pressure loss across the particle filter, the second channel has an open exit cross section which corresponds to the entry cross section. As a result, it is possible for the pressure loss to be set approximately proportionally to the number and dimensions of the perforations. In accordance with another feature of the invention, the closure of the first channel of the particle filter is constructed in such a way that it does not allow any fluid to pass through. In this case, the filter passages form the only entry to the second channel. The closure of the first channel serves as a barrier wall, so that the fluid is forced through the filter passages. Particles contained in the flow of fluid which accumulate at the filter passages are then collected in the region of the closure. This can be assisted, for example, by providing a type of cage in the region of the closure. Due to the formation of the flow in the region of the closure, it is possible for a dammed region of the fluid formed at that location to be utilized in such a way that although particles do reach that region, they are then deposited in that region. Consequently, the filter passages remain clear and the particle filter requires fewer regeneration cycles. The particle filter may have suitable regeneration measures for regeneration such as, for example electrical heating, a catalytic coating or the like, in the region of the closure.

In accordance with a further feature of the invention, in order to simplify production of the particle filter, the first channel and the second channel have the same structure but are disposed in opposite directions relative to one another. This means that only one production tool is required for a metal foil. In the case of a particle filter having a layered structure, all of the metal foils can initially pass through production in one direction, and are only subsequently turned so that they alternate in opposite directions relative to one another. Advantageously, the first and second channels also form a honeycomb body which can preferably be produced in this way, with first and second channels alternating.

In accordance with an added feature of the invention, the walls of the first and second channels are formed from a single metal foil. This enables the metal foil to be unwound from a roll of metal foil, then subjected to a desired perforation step and for a desired shape to be imposed on the metal foil in the processing station which follows. The metal foil can then be formed into the particle filter either in wound or layered form. It is only at this working step that it is necessary for the metal foil to be cut off the roll of metal foil. The particle filter which has been layered or wound in this manner has joins that are produced, for example, by brazing, at locations where the individual walls touch one another.

In accordance with an additional feature of the invention, it is preferable to use a metal foil which has a coating before it is processed. This coating may either be of a catalytic nature, with the result that the surface of the particle filter is once again increased in size considerably due to the coating, or the coating may also include a joining element, such as, for example, brazing material, for joining walls of the particle filter which are in contact with one another. For this purpose, by way of example, the joining element is applied to the metal foil in strip form during or before the processing to form the particle filter. The joining element can also be applied, for example, to a suitable coating of the metal foil.

In accordance with yet another feature of the invention, in order to increase the surface area of the particle filter, it has also proven advantageous if the first and/or second channel has a tapering cross section. This cross section is preferably in the shape of a wedge. In the case of the first channel, the tapering cross section serves as an inlet and, as a result, reduces the pressure loss of the fluid flowing in. Furthermore, the active surface area which is acted upon by fluid is increased in size, since the fluid flows onto the surface at an angle. At the same time, this configuration enables particles which have accumulated at a filter passage to be, as it were, washed off by the fluid flowing onto the particles. As a result, the particles which are to be filtered out are moved onward into the region of the closure of the first channel. This movement of the particles is assisted by the fact that opposite walls of the metal filter in each case have perforations. As a result, a laminar flow is formed along these walls, with the fluid remaining in motion along this laminar flow. Due to turbulence formed in the central region of a channel of this type, the particles are carried onward, over the length of the channel, into the region of the channel closure, where they can be deposited.

A further important parameter of a particle filter is the pressure loss which it causes. However, to enable a large surface area to be formed in combination with a high filter action but without a high pressure loss, tests have shown that it is expedient to adapt the diameter of the filter passages. Therefore, in accordance with yet a further feature of the invention, the filter passage is a hole in the metal foil with a size of between 3 and 25 $\mu$m, preferably 5 $\mu$m. It is possible to optimize these otherwise contradictory parameters with a diameter of this type. This is assisted if the particle filter has approximately between 80,000 and 120,000 filter passages per m$^2$ of wall. In this case, the square meter of wall is defined in such a way that the flowing fluid can flow onto it.

Since the particle filter, particularly when used in motor vehicles, is exposed to high temperatures, it is necessary for it to be thermally stable and also stable with respect to mechanical vibrations. In accordance with yet an added feature of the invention, this can be achieved with a metal foil which makes it possible to produce a wall with filter passages having a wall thickness between 20 $\mu$m and 65 $\mu$m, preferably between 30 $\mu$m and 40 $\mu$m. Particularly if the wall is between 30 $\mu$m and 40 $\mu$m, it is possible to produce the channels without major outlay when producing a particularly lightweight particle filter which, nevertheless, has sufficient stability and strength during operation.

In accordance with yet an additional feature of the invention, the coating of the particle filter is applied after the channels have been produced.

With the objects of the invention in view, there is also provided a process for producing a particle filter, especially the particle filter described above, from metal foil, which comprises pulling the metal foil out of at least one endless storage device, applying a joining element, in particular in strip form, to the metal foil, shaping the metal foil for producing subsequent channels and winding or stacking the metal foil to form first channels and second channels oriented in opposite directions. The first channel has an open entry cross section disposed at a first end side of the particle filter and extending at least partway into the first channel. The first channel also has a closure disposed opposite the entry cross section toward a second end side of the particle filter. Contact surfaces of the channels bearing against one another are permanently joined, to create the particle filter exclusively from metal foil.

In accordance with another mode of the invention, the metal foil is coated before or after the above steps.

In accordance with a concomitant mode of the invention, the metal foil is perforated before or after the above steps.

Other features which are considered as characteristic for the invention are set forth in the appended claims.

Although the invention is illustrated and described herein as embodied in a particle filter of metal foil and a process for producing a particle filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
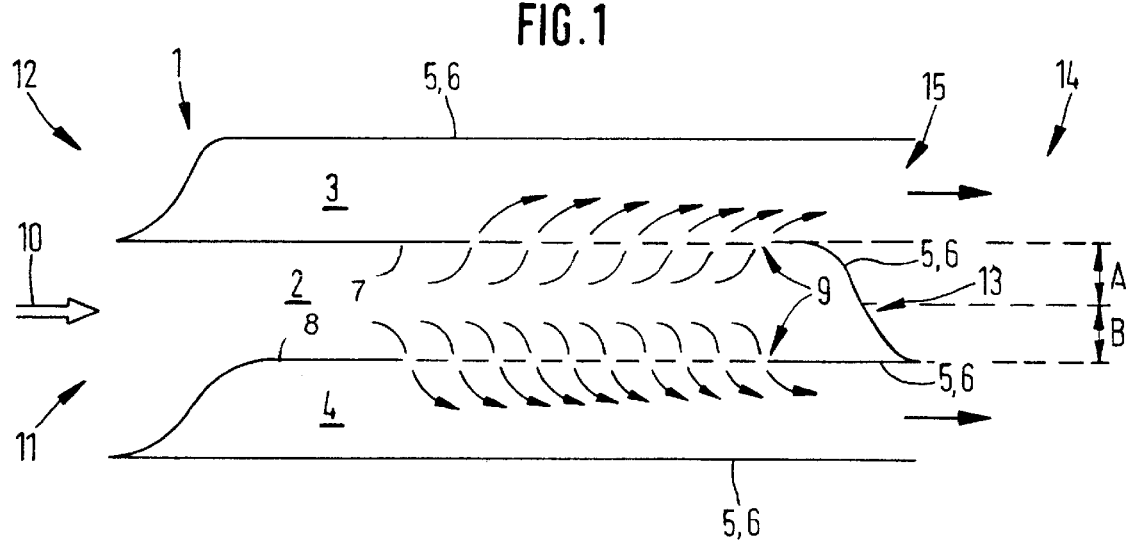
FIG. 1 is a diagrammatic, elevational view of a first particle filter made from metal foil which is coated.

Referring now to the figures of the drawings in detail and first, particularly, to FIG. 1 thereof, there is seen a first particle filter 1 which has a first channel 2, a second channel 3 and a third channel 4. The first particle filter 1 is constructed from metal foils 5 which are layered on top of one another. The metal foils 5 form walls 6 of the channels 2, 3, 4. A first wall 7 and a second wall 8, which together form the first channel 2, have first perforations 9 as filter passages leading to the second channel 3 and the third channel 4. A fluid 10 which flows through the particle filter 1, as indicated by arrows, enters an open entry cross section 11 at a first end side 12 of the particle filter 1. The entry cross section 11 extends into the first channel 2. The fact that the first channel 2 has a closure 13 opposite the entry cross section 11, toward a second end side 14, means that the fluid is forced through the perforations 9. This is because a counterpressure, which forces the fluid 10 into the second channel 3 and the third channel 4, is built up at the closure 13.

According to the illustrated embodiment, the closure 13 does not have any perforations and is therefore closed off in a gastight manner to the fluid 10 which can flow through. In another non-illustrated structure, the closure 13 also has perforations. This allows the fluid 10 to be guided through the entire length of the first channel 2. According to a further advantageous configuration, perforations are provided only in a first region A of the closure 13, while there are no perforations in a second region B of the closure 13. As a result, the second region B acts as a dead space and a location for particles to accumulate in the first channel 2, due to the lack of flow in that region.

The second channel 3 has an open exit cross section 15, which corresponds to the open entry cross section 11 of the first channel 2. The open entry cross section 11 and the open exit cross section 15 illustrated in this figure have the advantage of acting as nozzles or diffusers for the fluid 10, due to their narrowing or increasing in size. This contributes to minimizing pressure losses across the first particle filter 1. However, on one hand, it is also possible for the exit cross section 15 to be larger than the entry cross section 11, with the result that the flow of fluid is slowed down. If, on the other hand, it is desired for the flow velocity to be increased downstream of the particle filter, the exit cross section 15 may also be made smaller than the entry cross section 11.

Figure 2:
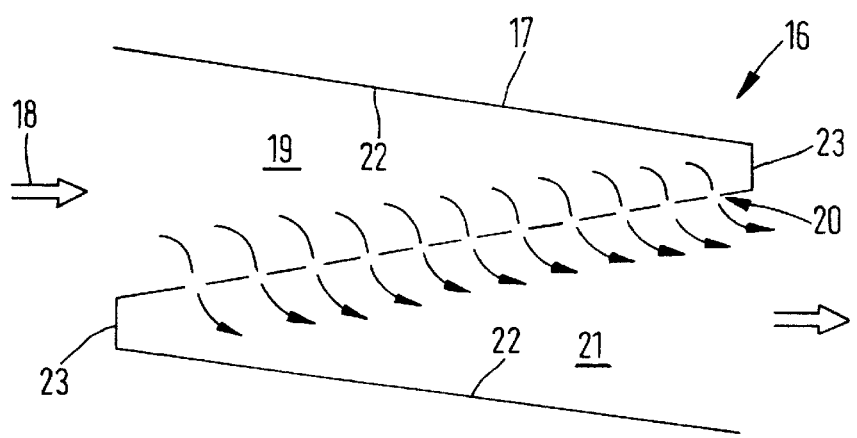
FIG. 2 is a view similar to FIG. 1 of a second particle filter which is made from a metal foil.

FIG. 2 shows a second particle filter 16. The second particle filter 16 is produced from a metal foil 17. A particle-laden second fluid 18, indicated by an arrow, flows through a fourth channel 19 and through second perforations 20, into a fifth channel 21. The metal foil 17 is folded in such a way that it forms third walls 22 of the channels 19, 21 and second closures 23. The cross section of the channels 19, 21 tapers. In a preferred configuration, the cross sections narrow in the shape of a wedge. In this way, it is possible to achieve a nozzle-like effect over the entire length of a channel and to increase the area of each channel onto which fluid flows.

Figure 3:
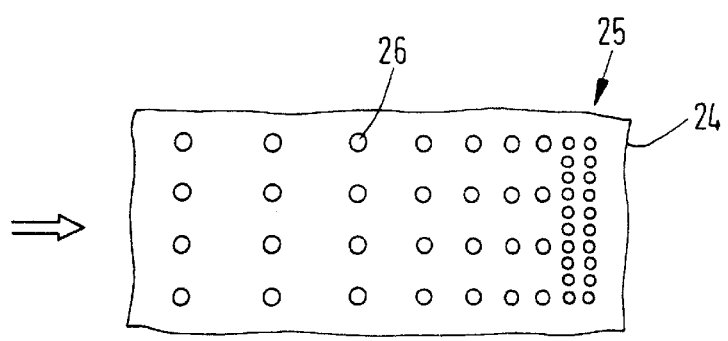
FIG. 3 is a plan view showing a variation of perforation in a metal foil of a particle filter.

FIG. 3 shows a part 24 of a metal foil with a variation of third perforations 25. A density of filter passages 26 increases over the length of the part 24. This can be achieved by changing distances between the filter passages 26, as well as the number and diameter of these passages. As illustrated, a fluid, indicated by an arrow, advantageously flows onto the part 24. The result is a flow in the channel which uses the entire length of the part 24.

Figure 4:
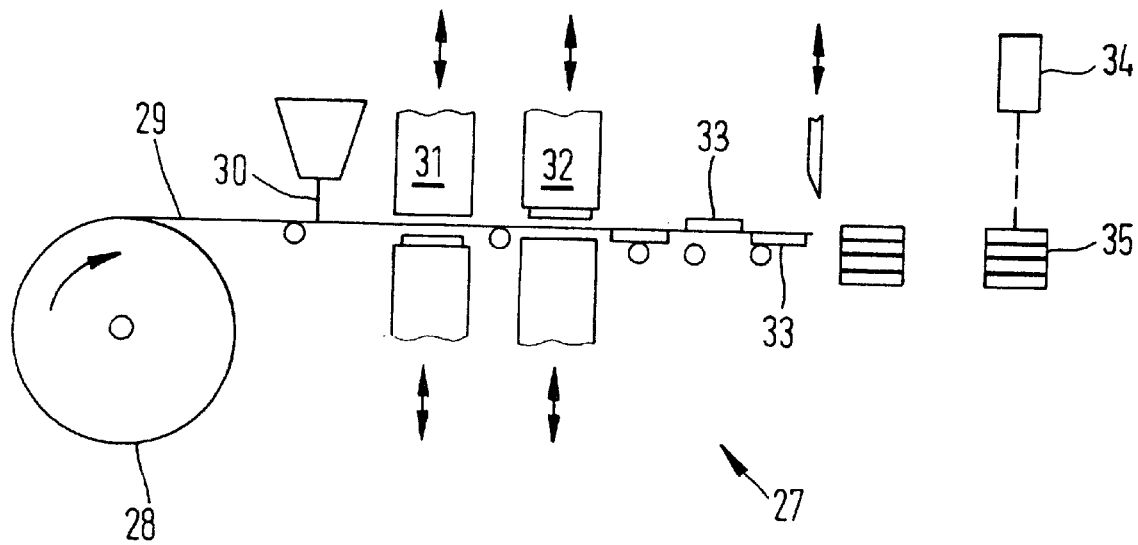
FIG. 4 is a side-elevational view of a production line for production of a particle filter from metal foil.

FIG. 4 shows an advantageous production line 27 which can be used to carry out a process for producing a particle filter from metal foil, in particular a particle filter according to the present invention. For this purpose, a metal foil 29 is unwound from an endless storage device, in this case a roll of metal foil 28. In the next working step, a joining element 30 is applied to the metal foil 29. This advantageously takes place in strip form, expediently along those regions in which surfaces that subsequently rest on top of one another are in contact with one another and are to be joined to one another. In a further step, the subsequent channels of a particle filter are shaped. In the illustrated embodiment, this is carried out through the use of a first press 31 and a second press 32. The first press 31 stamps the same geometry into the metal foil 28 as the second press 32. However, they are rotated through 180° with respect to one another. During a subsequent working step, the stamped geometries 33 are separated from the metal foil 29, as is indicated by a knife blade and a double arrow. The stamping which is offset alternately through 180° allows the geometries that have been stamped in this manner to be stacked continuously on top of one another. The stamping leads to first and second channels being formed, which on one hand have the same shape but on the other hand are disposed in opposite directions relative to one another. Then, in a working step which is not illustrated, contact surfaces that bear against one another are permanently joined to one another, for example through the use of brazing, so that a particle filter is formed purely from a metal foil. In the next working step of the production line 27, a particle filter 35 is perforated through the use of a laser 34. The particle filter 35 is preferably provided, for example, with a catalytic coating before the perforation is made, a step which in turn increases the surface area of the particle filter 35.

I claim:

1. A particle filter, comprising:

first and second end sides;

a metal foil forming walls defining mutually adjacent channels through which a fluid can flow, each of said channels having at least one inlet and at least one outlet;

said channels including first and second adjacent channels, said first channel having an open entry cross section at said first end side extended at least partway into said first channel, and said second channel having an open exit cross section at least substantially corresponding to said entry cross section;

at least one of said walls defining said first channel having perforations formed therein as filter passages leading to said second channel; and a closure disposed at said first channel, opposite said entry cross section and toward said second end side, said closure substantially closing off said first channel to the fluid.

2. The particle filter according to claim 1, wherein said filter passages form the only entry to said second channel.

3. The particle filter according to claim 1, wherein said first and second channels have the same shape but open in mutually opposite directions.

4. The particle filter according to claim 1, wherein said first and second channels alternate with one another to form a honeycomb body.

5. The particle filter according to claim 1, wherein said walls defining said first and second channels are formed from a single metal foil.

6. The particle filter according to claim 1, wherein at least one of said channels has a tapering cross section.

7. The particle filter according to claim 6, wherein said tapering cross section is wedge-shaped.

8. The particle filter according to claim 1, wherein said filter passages are holes in said metal foil having a diameter of between 3 and 25 micrometers.

9. The particle filter according to claim 8, wherein said diameter is 5 micrometers.

10. The particle filter according to claim 1, wherein said filter passages number substantially between 80,000 and 120,000 per square meter of said walls.

11. The particle filter according to claim 1, wherein one of said walls having said filter passages is between 20 and 65 micrometers thick.

12. The particle filter according to claim 11, wherein said one of said walls having said filter passages is between 30 and 40 micrometers thick.

13. The particle filter according to claim 1, including a coating on said metal foil.

14. The particle filter according to claim 13, wherein said coating is applied after said channels have been produced.

15. The particle filter according to claim 1, wherein said perforations are formed after said channels have been produced.

* * * * *